F. C. WHITE.
EXPRESSION BOX FOR AUTOPNEUMATIC MUSICAL INSTRUMENTS.
APPLICATION FILED JUNE 26, 1911.
1,024,110.
Patented Apr. 23, 1912.
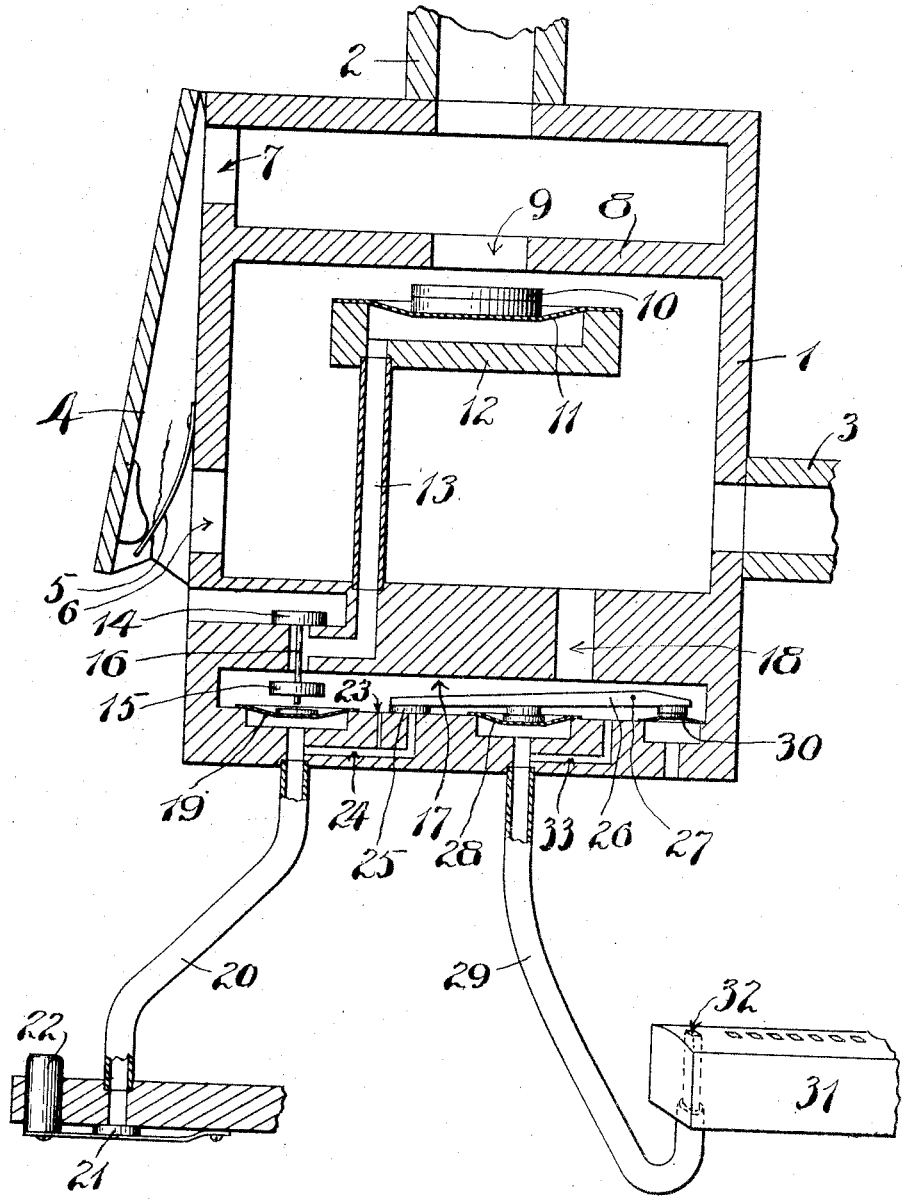

UNITED STATES PATENT OFFICE.

FRANK C. WHITE, OF MERIDEN, CONNECTICUT, ASSIGNOR TO THE WILCOX & WHITE COMPANY, OF MERIDEN, CONNECTICUT, A CORPORATION OF CONNECTICUT.

EXPRESSION-BOX FOR AUTOPNEUMATIC MUSICAL INSTRUMENTS.

1,024,110. Specification of Letters Patent. Patented Apr. 23, 1912.

Application filed June 26, 1911. Serial No. 635,311.

*To all whom it may concern:*

Be it known that I, FRANK C. WHITE, a citizen of the United States, residing at Meriden, New Haven county, State of Connecticut, have invented certain new and useful Improvements in Expression-Boxes for Autopneumatic Musical Instruments, of which the following is a full, clear, and exact description.

My invention relates to an improved expression controlling mechanism for autopneumatic music playing instruments.

The object of the invention is to provide an improved apparatus for the control of the air tension within the action chest whereby the action pneumatics may be operated with different degrees of force for the purpose of securing louder and softer effects.

In the drawing I have shown, conventionally and in section, so much of the apparatus as is necessary to a full understanding of my invention.

1 represents a casing or box.

2 represents a duct leading into the casing from the action chest and for the purposes of this case may be assumed to be a part of said chest.

3 represents the exhauster passage or duct.

The particular form of the action pneumatics in the action chest, as well as the exhauster, is immaterial to this invention.

4 represents a regulator bellows which is by preference employed.

5 is a valve controlled by the bellows 4, said valve being adapted to control a port 6 leading from said bellows into the space within the casing 1.

7 is a port leading into the aforesaid bellows from the space within the casing 1.

8 is a partition dividing the space within the casing 1.

9 is a port through the partition 8.

10 is a valve adapted to close the port 9.

11 is the movable part of a pneumatic for the valve 10. 12 is the body portion of said pneumatic. 13 is a duct leading from said pneumatic to the controlling valves 14—15. These valves are carried upon a stem 16. The valve 14 opens the duct 13 at times to the atmosphere, while the valve 15 opens the duct 13 at times to the tension of air within that part of the casing 1 below the partition 8, said communication being effected in this particular embodiment through a chamber 17 and a passage 18.

19 is a pouch pneumatic which may be provided with a central thrust plate or disk constituting a bearing arranged to engage the lower end of the stem 16. When the pouch 19 is distended, it will shift the valves 14—15 from the position shown in the drawing to that in which the valve 15 closes the duct 13 to the inside tension and valve 14 opens said duct 13 to atmosphere.

20 is a duct leading to the atmosphere and normally closed by a valve 21.

22 represents a press button representing one effective means for receiving finger pressure to open valve 21.

23 is a bleed hole leading from the chamber 17 into a passage 24, which connects the interior of the duct 20 and pneumatic 19 with the interior of said chamber 17.

The opening from the passage 24 into the chamber 17 is controlled by a valve 25 mounted in this instance upon a lever 26 pivoted at 27.

28 is a pouch pneumatic which at times is in communication with the atmosphere through a duct 29.

30 is a pouch pneumatic in communication with the atmosphere at all times and bearing against the short arm of the lever 26. The effect of the pneumatic 30 is to exert a pressure on the lever 27 to normally close the valve 25.

31 is a tracker. 32 is an opening therein for duct 29.

33 is a bleed hole from pneumatic 28 to the interior of casing 1 below partition 8.

The operation is as follows: Assuming the parts stand as shown in the drawing. The exhauster 3 will now draw the air from the action chest 2, the course of said air being through passage 9, and also through passages 7 and 6. When such a condition obtains, it is obvious that the same, or substantially the same, tension as is being produced in the exhauster will occur within the action chest. If it is desired to lower or cut down the tension in said chest for the purpose of causing the action pneumatics therein to act with less vigor, the passage 9 is closed, whereupon the only passage for the air is through the passages 7 and 6. This condition is manually effected as follows: The operator opens the valve 21, whereupon air at atmospheric pressure rushes in through the duct 20 to distend the pouch 19, shifting the valves 14—15. This closes the duct 13 to the inside tension and opens it to the atmosphere so that air may rush in through the duct 13 to distend the pouch pneumatic which operates the valve 10, causing said valve 10 to close the passage 9. The moment the valve 21 is again closed, the pouch pneumatic 19 is caused to collapse, being bled by the hole 23, whereupon the original condition shown in the drawing is restored. It will be observed that the valve 10 opens in a direction not against the direction of the flow of air through the passage 9, but, on the contrary, in the same direction, with the result that the quick opening of valve 10 does not cause any popping noise as frequently occurs where a valve operates in a direction opposite to the direction of the passage of the flow of air. With the parts thus far referred to in describing the operation, it is obvious that the valve 10 would remain closed only so long as the duct 20 is open to atmosphere.

In many instruments it is customary to provide automatic means, distinct from a manually controllable means, for varying the air tension in the action chest, and to that end I have provided an improved means for that purpose. This improved means comprises the aforesaid valve 25 carried by the lever 26 and controlled by the pneumatics 28—30. The duct 29, which communicates with the pouch pneumatic 28, leads, as described, to an opening 32 in the tracker board 31. Whenever a note sheet, properly perforated, traverses the tracker board and a perforation registers with the inlet 32, air at atmosphere will be permitted to enter the pouch pneumatic 28 with sufficient force to operate the lever 26 and open the valve 25 instantly putting the pouch pneumatic 19 in communication with the tension of air in the casing 1, with the result that said pneumatic 19 will be caused to collapse, thereby moving the valves 14—15 to the position shown in the drawing and opening the valve 10. In this connection, it should be first understood that whenever it is desired to operate the tension controlling mechanism automatically, the valve 21 should be held or latched open so that valve 10 will stand normally closed. Under such conditions, so long as a note sheet closes the opening 32 in the tracker board, the pouch pneumatic 28 will be collapsed so that the valve 25 will close its passage, thereby preventing air at atmospheric pressure from entering the casing 1 except such as may enter through the small bleed hole 23 which is so insignificant as to be negligible under these conditions. When a perforation in the note sheet registers with opening 32, air at atmospheric pressure freely enters pouch pneumatic 28 and opens valve 25, whereupon pouch pneumatic 19 is operated to shift valves 14—15 so as to open valve 10.

When an instrument is equipped with both automatic and manual tension controlling mechanisms, such as described, it is obvious that the automatic tension controlling mechanism will have no effect upon varying the tension of air within the casing 1 unless the valve 21 is open; hence, when being manually controlled (the valve 21 being closed normally) the operation of the valve 25 will have no effect in varying the tension even though the note sheet has perforations for duct 32.

From the foregoing it will be seen that the opening of the duct 20 performs the function of closing the valved passage 9, whereas the opening of the duct 29 performs the function of opening the valved passage 9, it being essential in this particular form of construction that the admission of air at atmospheric pressure at these two different points, namely, 21 and 31, shall operate the valve 10 in relatively opposite directions in order that said manual and automatic controlling mechanisms shall be independently operable.

While in the preferred construction it is desirable that the passage employed when low tension is occurring shall be provided with a regulator such as the pneumatic 4 controlling the valve 5, in a broad sense it should be understood that my invention should not be limited to a regulated low tension passage since the area of such passage may be such that a relative low tension will occur whenever this is the only passage being utilized. Again, it should be understood that my invention in a broad sense need not be limited to having two separate or parallel air passages, since one passage might be sufficient, for example, the passage through the pneumatic 4, the same being provided with a high tension controlling valve operated by the pneumatic 11. Such a valve is shown in my former Patent, No. 852,751, dated May 7th, 1907.

What I claim is:

1. In a tension control for auto-pneumatic music playing instruments, a passage to be exhausted, an exhauster passage, a chamber connecting said passages, a pneumatic operating between said passages to vary the freedom of passage of air from the former to the latter depending upon whether said pneumatic is extended or collapsed, means for controlling said pneumatic comprising a duct leading from the interior of said pneumatic to the atmosphere, said duct having a branch leading into said space between said two first mentioned passages, a valve for said duct, and another valve for said branch, a carrier in common to said valves whereby only one of said valves at a time will operate to close its respective passage, a pneumatic for operating said valves, a valved passage leading from said pneumatic to the atmosphere, a bleed hole leading from the interior of said last mentioned pneumatic to the interior of said chamber, a relatively large passage also leading from the interior of said last mentioned pneumatic to the interior of said casing, a valve normally closing said passage, a pneumatic for operating said valve and a duct leading from said pneumatic to a tracker board opening for note sheet control.

2. In an automatic music playing instrument, an action chest, an exhauster, a passage between the two for putting the same in direct communication, a valve for said passage, a pneumatic for controlling the position of said valve, a passage from said pneumatic to the atmosphere, and also to the air tension of the exhauster, valve mechanism for controlling said passage to put said valve controlling pneumatic in communication with one or the other, a pneumatic for controlling said valve mechanism, and means for controlling the last mentioned pneumatic, comprising a manually operable valve for opening and closing atmospheric communication to the interior of the last mentioned pneumatic, and an automatically controllable mechanism for controlling said pneumatic when the manually controllable valve stands open, and means whereby said automatic controlling mechanism is ineffective when said manually controllable valve is closed.

3. In an automatic music playing instrument, an action chest, an exhauster, a passage between the two for putting the same in direct communication, a valve for said passage, a pneumatic for controlling the position of said valve, a passage from said pneumatic to the atmosphere, and also to the air tension of the exhauster, valve mechanism for controlling said passages to put said valve controlling pneumatic in communication with one or the other, a pneumatic for controlling said valve mechanism, and means for controlling the last mentioned pneumatic comprising a manually operable valve for opening and closing atmospheric communication to the interior of the last mentioned pneumatic, an automatically controllable mechanism for controlling said pneumatic when the manually controllable valve stands open, and means whereby said automatic controlling mechanism is ineffective when said manually controllable valve is closed, and a low tension by-pass leading from said action to said exhauster operative at all times.

4. In an automatic music playing instrument, an action chest, an exhauster, a passage between the two for putting the same in direct communication, a valve for said passage, a pneumatic for controlling the position of said valve, a passage from said pneumatic to the atmosphere, and also to the air tension of the exhauster, valve mechanism for controlling said passage to put said valve controlling pneumatic in communication with one or the other, a pneumatic for controlling said valve mechanism, and means for controlling the last mentioned pneumatic, comprising a manually operable valve for opening and closing atmospheric communication to the interior of the last mentioned pneumatic, an automatically controllable mechanism for controlling said pneumatic when the manually controllable valve stands open, and means whereby said automatic controlling mechanism is ineffective when said manually controllable valve is closed, and a low tension by-pass leading from said action to said exhauster operative at all times, and a pneumatic regulator for said low tension by-pass.

FRANK C. WHITE.

Witnesses:
F. E. BEMIS,
O. O. TOLLES.

---

Copies of this patent may be obtained for five cents each, by addressing the "Commissioner of Patents, Washington, D. C."